Dec. 17, 1963  W. G. MORGAN  3,114,526
AIRCRAFT
Filed Nov. 9, 1961  8 Sheets-Sheet 1
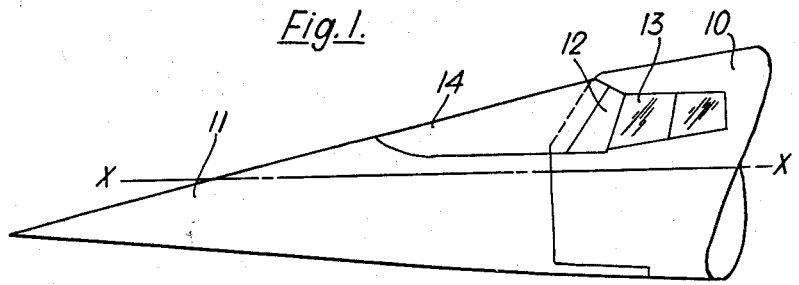
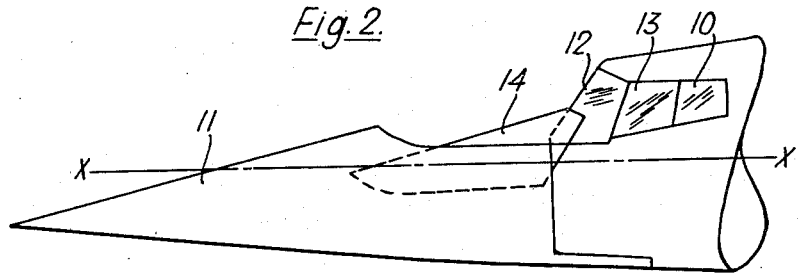
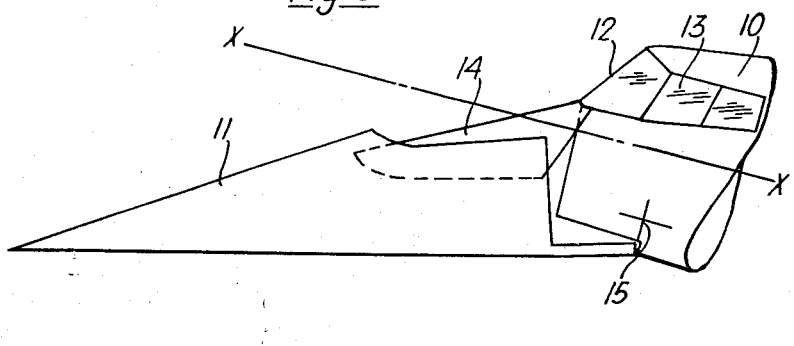
Inventor
WILLIAM GEORGE MORGAN
By
Bailey, Stephens & Huettig
Attorneys Dec. 17, 1963  W. G. MORGAN  3,114,526
AIRCRAFT Filed Nov. 9, 1961  8 Sheets-Sheet 2

Inventor
WILLIAM GEORGE MORGAN
By
Bailey, Stephens & Huettig
Attorneys

Dec. 17, 1963 W. G. MORGAN 3,114,526
AIRCRAFT
Filed Nov. 9, 1961 8 Sheets-Sheet 4

Inventor
WILLIAM GEORGE MORGAN

By
Bailey, Stephens & Huettig
Attorneys

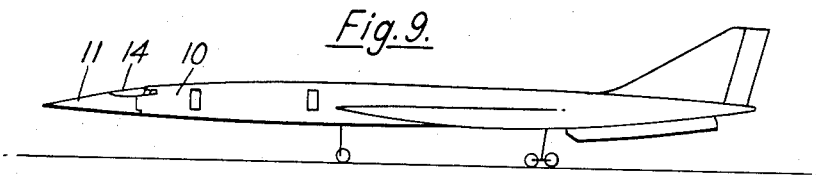
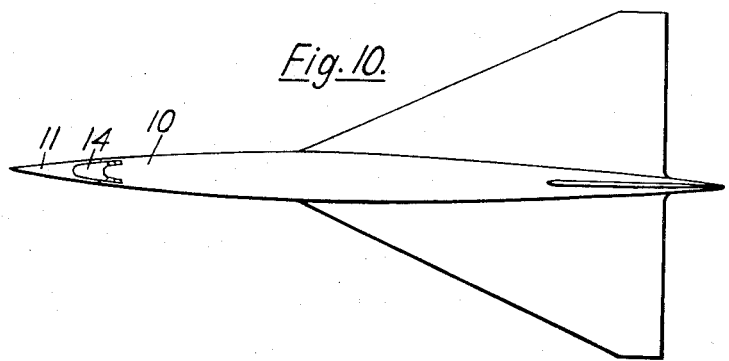
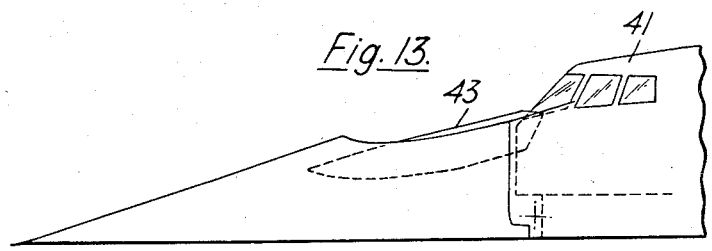
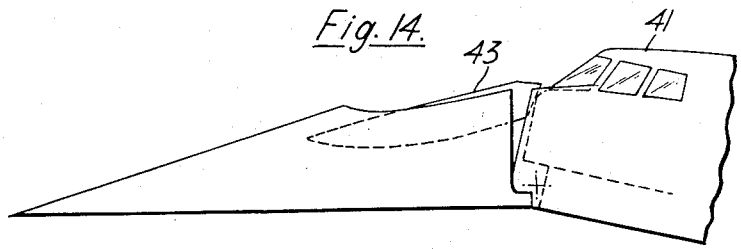

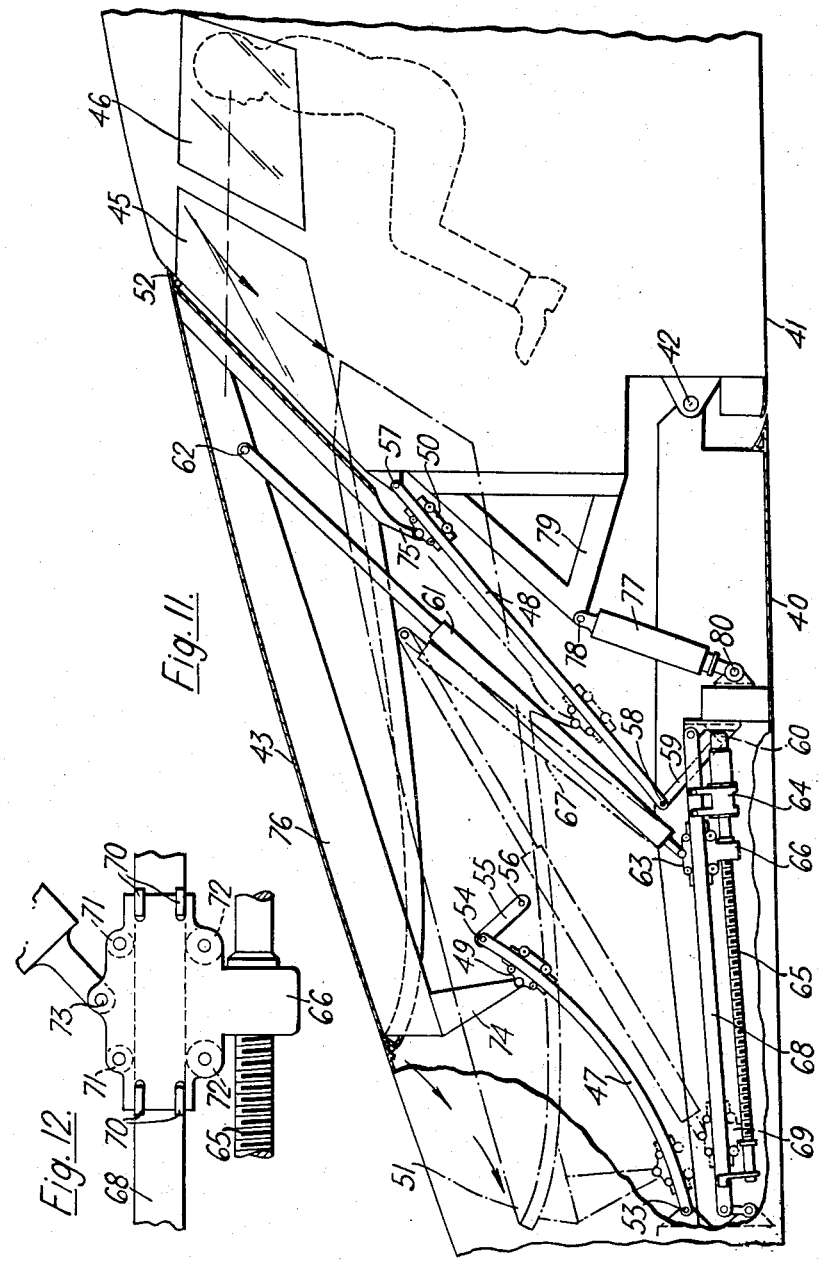

Dec. 17, 1963  W. G. MORGAN  3,114,526
AIRCRAFT
Filed Nov. 9, 1961  8 Sheets-Sheet 7
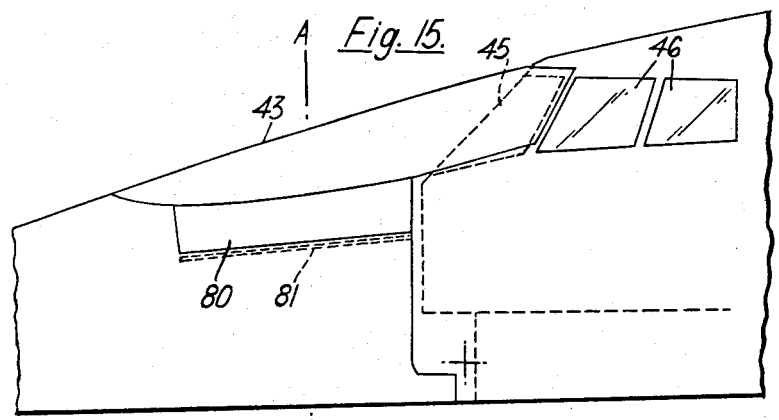
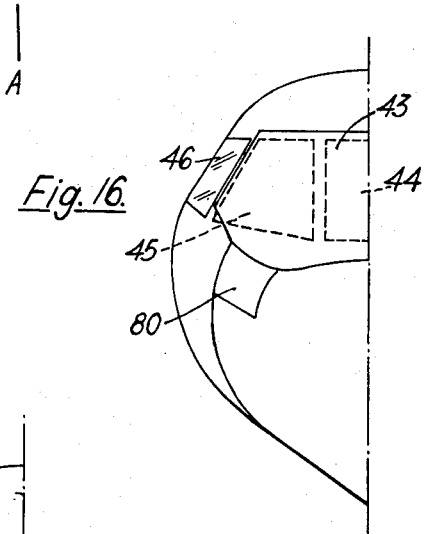
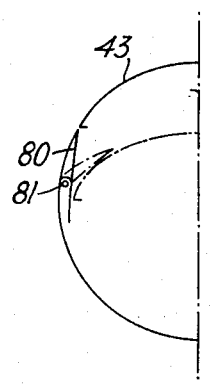
Inventor
WILLIAM GEORGE MORGAN
By
Bailey, Stephens & Huettig
Attorneys Dec. 17, 1963 W. G. MORGAN 3,114,526
AIRCRAFT
Filed Nov. 9, 1961 8 Sheets-Sheet 8
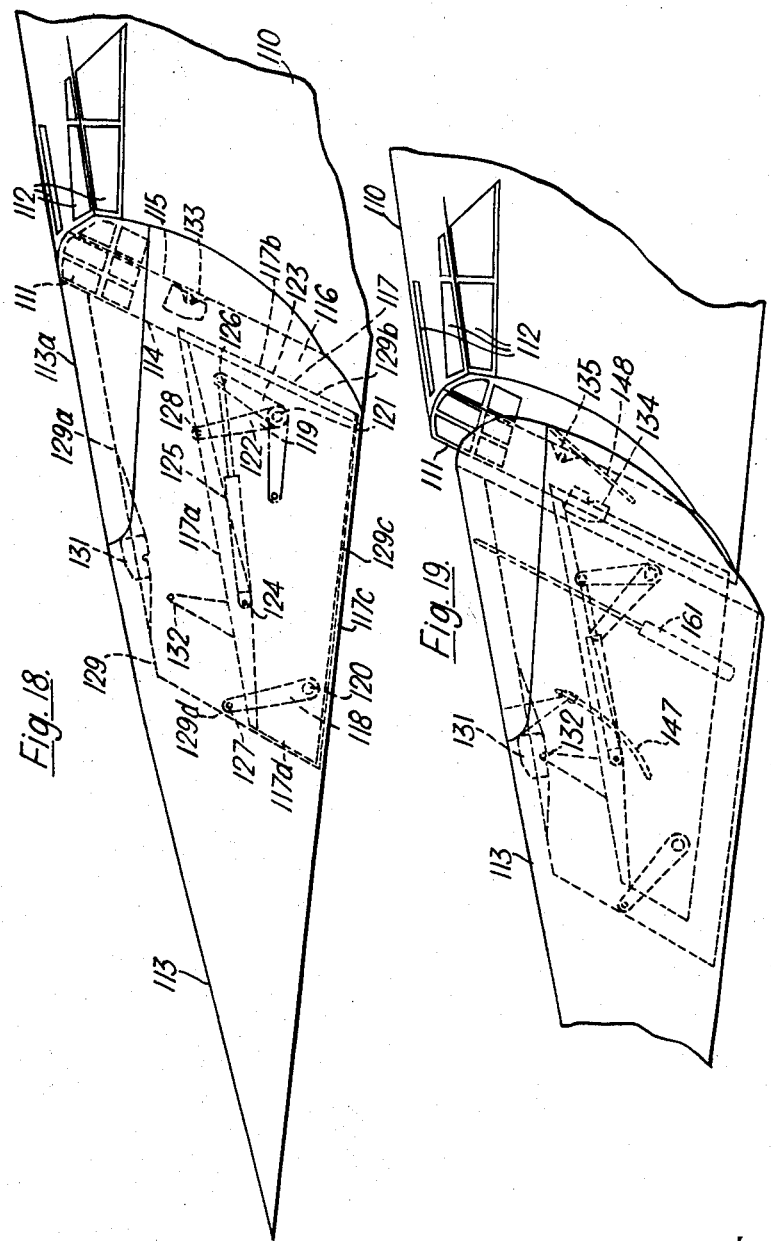
Inventor
WILLIAM GEORGE MORGAN
By
Bailey, Stephens & Huettig
Attorneys United States Patent Office 3,114,526
Patented Dec. 17, 1963

3,114,526
AIRCRAFT
William George Morgan, Stonebridge House,
Colston Ave., Bristol 1, England
Filed Nov. 9, 1961, Ser. No. 151,289
Claims priority, application Great Britain Nov. 14, 1960
5 Claims. (Cl. 244—120)

In an aircraft designed to operate at speeds of the order of Mach 2 or Mach 3 it is desirable for the outline of the aircraft when flying at such speeds to be free of any excrescences or discontinuities. The general shape of the nose should be a sharp cone. Now at high speeds it is possible for the pilot to fly on instruments and to do without a forward view, but during landing and take-off, and when maneuvering on or near the ground, it is very desirable for the pilot to be able to see clearly ahead. Moreover his view should then not be through a small dome or periscope, which is liable to be dangerously obscured by small pieces of dirt if used at landing and take-off, but through a windscreen (that is to say, a forwardly facing window) of substantial area.

According to the present invention a high speed aircraft with a windscreen has a movable panel which can be moved between a first position in which it lies in front of the windscreen to provide the fuselage of the aircraft with the required streamlined shape for high speed flight, and a second position downwards from the first position in which it lies inside the nose of the aircraft and at least partly exposes the windscreen.

This invention is particularly applicable to supersonic aircraft but it also applicable to subsonic aircraft. In general it is useful especially for delta-wing and other aircraft which have to be upwardly inclined fairly steeply to give the necessary angle of incidence to the wings during landing or take-off.

The windscreen may be completely exposed on lowering the movable panel, but in the interest of making the forward vision through the windscreen as good as possible during landing and take-off without making the contours of the fuselage depart to any substantial degree from the ideal aerodynamic contours, the nose of the aircraft is preferably arranged so that it can be lowered during landing and take-off. In one possible arrangement movement of the panel alone only partly exposes the windscreen, and the panel is carried by the nose of the aircraft so that it is moved downwards when the nose is lowered and then fully exposes the windscreen.

The nose is preferably pivoted to the main part of the fuselage of the aircraft so that it is lowered by a downwards swinging movement about the pivot axis. As an alternative the aircraft may include a member which is rigidly fixed to the main part of the fuselage and projects forwards from the main part of the fuselage into the interior of the nose, the nose being constrained to move in an arcuate path relative to the fuselage by links pivoted to the nose and to the member, the path being such that, from a position in alignment with the fuselage, the nose can move bodily downwards and forwards; in this case the links preferably form a parallel motion linkage.

As compared with aircraft proposed hitherto, supersonic aircraft according to the present invention are an improved compromise between the conflicting design characteristics resulting from the important requirements of supersonic aircraft, namely good streamlining during supersonic flight, good forward vision during landing and take-off, and a method of providing forward vision which does not involve unduly complicated and heavy mechanism.

Examples of aircraft according to the present invention are shown in the accompanying drawings. In these drawings:

FIGURES 1 to 3 show the outlines of the front of the aircraft with the nose and panel in different positions.

FIGURE 9 is a side view of the complete aircraft;

FIGURE 10 is a plan view of the complete aircraft;

FIGURE 11 is a partly sectioned side view of the front of a second aircraft with a different mechanism controlling the movable panel;

FIGURE 12 is an enlarged view of part of the mechanism shown in FIGURE 11;

FIGURE 13 shows in outline the front of the aircraft shown in FIGURE 11 after the panel has been lowered;

FIGURE 14 shows the outline after the nose has also been lowered;

FIGURE 15 is a side view showing further details of the aircraft shown in FIGURE 11;

FIGURE 16 is half of a view from the front of the aircraft shown in FIGURE 11;

FIGURE 17 is a diagrammatic section on the line A—A in FIGURE 15;

FIGURE 18 is a side view of the front of the fuselage of another aircraft, with the nose of the aircraft in an "up" position; and FIGURE 19 shows the aircraft of FIGURE 18 after the nose has been lowered.

Figure 4:
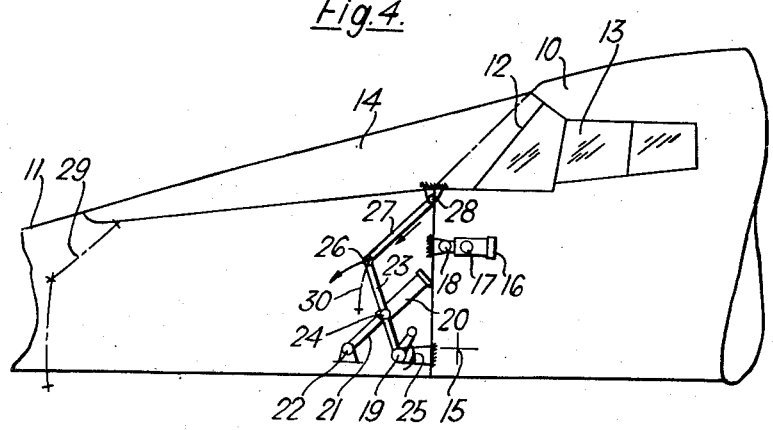
FIGURES 4 to 8 show the mechanism which controls the nose and panel.

The aircraft shown in FIGURES 1 to 10 is a delta-wing aircraft (as shown in FIGURES 9 and 10). It has a fuselage 10 which has a substantially conical nose 11 and a windscreen 12. Part of the upper surface of the nose is formed by a movable panel 14 which lies in front of the windscreen when the aircraft is in its streamlined state suitable for supersonic flight, as shown in FIGURE 1. In addition to the windscreen there are side windows 13 which form part of the normal streamlined contours of the fuselage and are not covered by the movable panel 14. The line XX represents the fore and aft datum line of the aircraft.

FIGURE 2 shows the panel 14 lowered to an intermediate position in which the windscreen 12 is partly exposed, thus providing some forward vision for the pilot. The front edge of the panel may be arranged to move closer to the inside surface of the nose so as to cause the minimum disturbance to the continuity of contour, while at the same time keeping the rear edge close to the windscreen as shown.

FIGURE 3 shows the fuselage 10 and datum line XX inclined upwards in a forwardly facing direction in an attitude which might exist during take-off or landing. The nose 11 has been pivoted downwards about an axis 15, and the panel 14 has been moved downwards and forwards into the nose so that the windscreen 12 is fully exposed.

Referring to FIGURE 4, a hydraulic jack 16 is pivoted to the main part of the fuselage at 17 and its piston rod is coupled to a pivot 18 on the nose 11. In FIGURE 4 the jack 16 is shown retracted so that the nose is in its "up" position.

The mechanism associated with the panel 14 includes a hydraulic jack 20, the piston rod 21 of which is pivoted at 22 to the nose. An arm 23 is pivoted at about its midpoint at 24 to the hydraulic jack 20, and at 19 at its lower end to the main part of the fuselage. An arm 25 forms a bell-crank with the arm 23, and the function of this will be described later. The upper end of the arm 23 is pivoted at 26 to an arm 27 which is connected at 28 to the panel 14.

Figure 5:
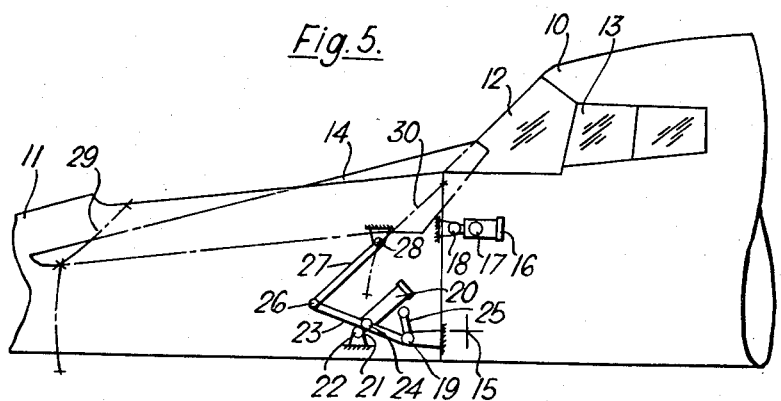

In order to lower the panel 14, the piston rod 21 is retracted into its jack 20, thus causing the arm 23 to rotate in a counter-clockwise direction about the pivot 19. The upper end of the arm 26 thus, through the arm 27, pulls the panel forwards and downwards into the position shown in FIGURE 5. The movement of the panel is also controlled by guide means (such as rollers engaging in guide ways) lying along lines 29 and 30. FIGURE 5 shows the position of the panel which would be adopted for subsonic flight.

Figure 6:
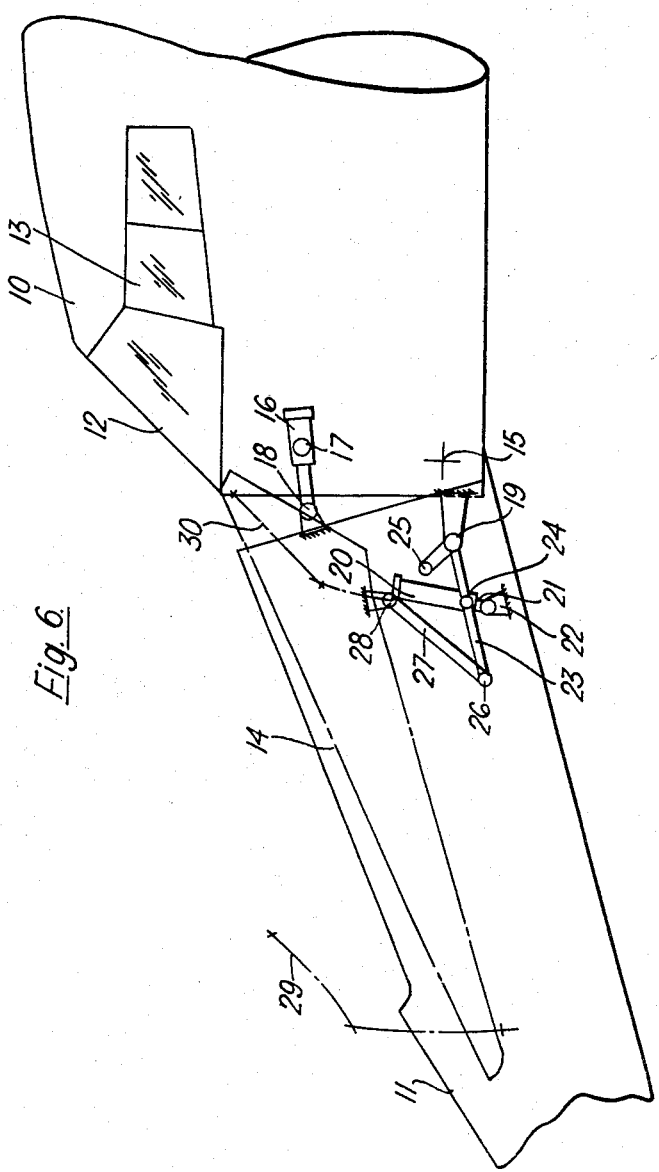

In order to achieve the position of the nose shown in FIGURE 3, after the panel 14 has been brought to the position shown in FIGURES 2 and 5, the hydraulic jack 16 is extended, thus causing the nose to rotate in a counter-clockwise direction about the pivot 15 into the position shown in FIGURE 6. The movement of the nose carries the panel downwards and forwards so that the windscreen becomes fully exposed.

The hydraulic apparatus described above may be fitted with locking devices which require to be unlocked before the commencement of any operation and which automatically re-lock on completion of each operation. Locking devices suitable for this purpose are well known and need no description in this context.

It will be seen that the hydraulic systems for moving the panel 14 and the nose 11 are completely independent of each other, so that if the nose control mechanism fails to operate, the panel 14 may still be operated to expose the windscreen as shown in FIGURES 2 and 5.

Figure 7:
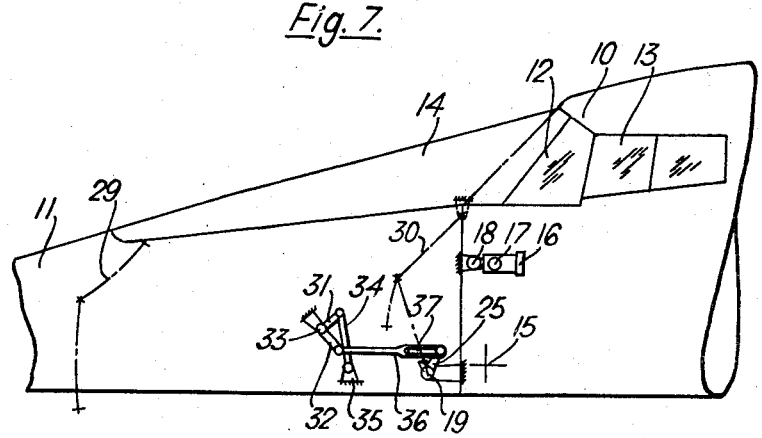
Figure 8:
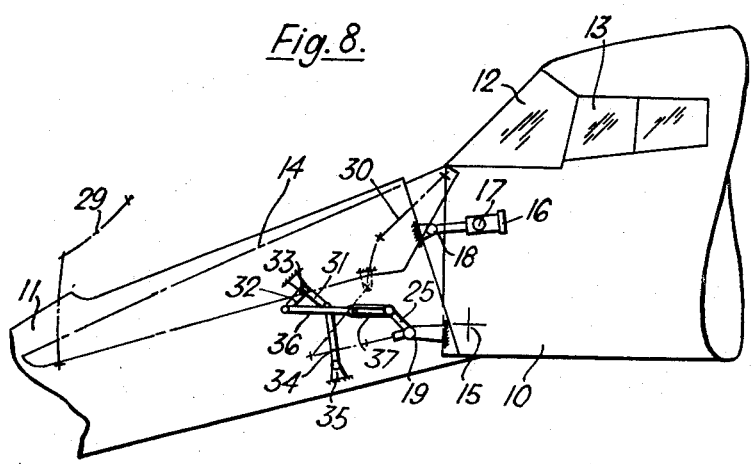

If the panel hydraulic system fails to operate, the panel is moved into the nose by a lost-motion linkage shown in FIGURES 7 and 8. In this mechanism, a bell-crank with arms 31, 32 is pivoted at 33 to the nose. The arm 31 is connected to an arm 34, which is pivoted at 35 to the nose. The arm 32 is connected to a link 36 which is slotted at 37 to engage the end of the arm 25.

When the panel hydraulic system functions properly, the arm 25 is rotated in a counter-clockwise direction so that its end moves idly along the slot 37. Then as the nose mechanism is operated to lower the nose, the link 36 moves to the left, and because of the position of the arm 25 in the slot 37, no movement is imparted to the arm.

On the other hand, if the panel hydraulic system fails, operation of the nose will cause the link 36 to move to the left from the position shown in FIGURE 7 and thus rotate the arm 25 in a counter-clockwise direction and bring the panel lowering mechanism into operation until the position shown in FIGURE 8 is reached.

FIGURE 11 shows the front of a fuselage in which a nose 40 is pivoted to the main part 41 of the fuselage on a pin 42. Part of the nose is formed by a movable panel 43 which, when it is in its upper position, lies in front of a windscreen formed by a central pane 44 (see FIGURE 16) facing squarely in a forward direction, and panes 45 on opposite sides of the pane 44 and facing slightly to the side. The aircraft also includes side windows 46 which are not covered by the panel 43.

The panel 43 is guided by rods 47 and 48 along which runners 49 and 50 connected to the panel respectively near the front and back ends of the panel can move. The rod 47 is curved so as to be convex rearwards and slightly downwards so that during downward movement of the panel the front end of the panel drops rapidly at the start and then continues with an increasing forward movement to the final position 51 shown in broken lines. As a result of the initial rapid dropping of the front edge of the panel, the upper edge 52 at the back of the panel moves slightly forwards and thus clears any windscreen wiper or other obstruction which may be on the windscreen. When the panel 43 is in its upper position as shown in FIGURE 11, it forms a seal with an inflated tube extending around the edge of the windscreen and the edge of the nose so as to prevent the nose from being evacuated by a venturi action during flight.

The guide rod 47 is pivoted at one end 53 to a structural member in the nose, and at the other end 54 to a link 55 which is pivoted to a structural member in the nose (not shown) at 56. The presence of the link 55 allows for expansion and contraction of the rod 47 resulting from temperature variations, and it also allows for manufacturing tolerances in the length of the rod 47. The rod 48 is pivoted at one end 57 to the main part of the fuselage, and at the other end 58 to a link 59 which is pivoted to the nose at 60. The link 59 serves the same purpose as the link 55 and in addition allows for slight movement of the rod 48 which takes place when the nose is moved downwards about the pivot 42.

Movement of the panel 43 with respect to the nose is controlled by an hydraulic jack 61 having an upper end pivoted to the panel at 62, and a lower end pivoted to a member 63. The member 63 is in the form of a runner forming part of a screw jack coupled to an electric motor 64. The screw jack includes a screw 65 which passes through a threaded bore in a part 66 of the runner.

In normal circumstances the panel 43 would be lowered by retracting the jack 61 so that the jack takes up the position shown by the broken line 67. In the event of the jack 61 failing to operate, the motor 64 is used to drive the screw 65 of the screw jack so as to move the runner 63 forwards along a guide 68 to the position shown in broken lines at 69, so as to lower the panel.

FIGURE 12 shows the runner 63 in detail. It will be seen that the runner includes four rollers 70 engaging each side of the guide 68, two rollers 71 engaging the top of the guide, and two rollers 72 engaging the bottom of the guide. The jack 61 is pivoted to the runner by a pin 73.

The runners 49 and 50 are similar to the runner 63 except that they do not include the part 66. The pins 73 of the runners 49 and 50 pivot the runners respectively to parts 74 and 75 which extend downwards from a central structural member 76 in the panel.

FIGURE 13 shows the outline of the front of the fuselage after the panel 43 has been lowered.

Movement of the nose 40 of the fuselage with respect to the main part 41 of the fuselage is controlled by an hydraulic jack 77 which is pivoted at 78 to a bracket 79 on the main part of the fuselage, and is pivoted at 80 to the nose. When the jack 77 is extended, the nose is swung downwards about the pivot 42 to the position shown in FIGURE 14.

In order to reduce air turbulence when the panel is lowered, a part of each side of the nose is formed by a fairing panel 80a which is pivoted to the remainder of the nose at its bottom edge 81 so that it can be swung inwards to engage the panel after the panel has been lowered, as shown in FIGURE 17. Additionally, each side of the main part of the fuselage may also be formed with a fairing panel which can be swung inwards in order to reduce air turbulence after the panel 43 has been lowered. Movement of the panels 80a or of the additional fairing panels may be produced automatically, as a consequence of the nose being lowered, by mechanism operated mechanically or hydraulically or in any other way.

It will be seen that the shape of the panel 43 in cross-section at the section line A—A, as shown in FIGURE 17, is a smooth curve. It will be appreciated that the panel merges gradually into this curve from the angular shape which it has at its rear edge as shown in FIGURE 16.

FIGURES 18 and 19 show an alternative way in which the nose of an aircraft may be made movable. The fuselage 110 in this case has a windscreen 111 and also transparent panels 112 which face upwards and sideways. A nose cone 113 is movable between the upper position shown in FIGURE 18 and the lower position shown in FIGURE 19. It will be seen that the nose cone partly exposes the windscreen when in its lower position. The windscreen is fully exposed by moving a panel 113a downwards and forwards into the nose, the panel being guided by rods 147 and 148 carried by the nose and being actuated by a hydraulic jack 161, in a manner similar to the arrangement shown in FIG. 11.

The dotted lines 114 and 115 represent diagrammatically a main structural member of the fuselage to which is secured a structural member 117 whose sides are represented by 117a, 117b, 117c and 117d. Levers 118 and 119 are pivoted to the frame 117 at 120 and 121, the lever 119 having arms 122 and 123. Pivoted to the structural member 117 at 124 is an hydraulic jack 125, the rod of which is attached at 126 to the arm 123. The free ends 127 and 128 of arms 118 and 122 are pivoted to a structural member 129 of the nose cone 113. This structural member 129 is represented by the lines 129a, 129b, 129c and 129d. An "up" lock 133 is provided which consists of parts 134 attached to the nose cone and 135 attached to the fuselage. The mechanism also includes a "down" lock formed by members 131 and 132 which interlock when the nose is in the "down" position.

In FIGURE 18 where the nose cone forms a continuous streamlined contour with the remainder of the fuselage, the hydraulic jack 125 is extended and the nose cone "up" lock 133 is engaged, its members 134 and 135 being interlocked.

If it is required to move the nose cone to its "down" position, hydraulic pressure is fed to the "up" lock 133 in such a manner as to free the members 134 and 135 from each other and, in sequence with this operation, hydraulic pressure is fed to the jack 125 so as to cause it to shorten. As the end 124 of the jack is pivoted to the member 117, which is fixed relative to the fuselage, the arms 118 and 122 are caused to rotate counterclockwise, thus moving the nose cone forwards and down to the position shown in FIGURE 19.

If it is required to move the nose cone upwards from this position, the "down" lock is freed and pressure is applied to the jack so as to lengthen it and thus cause the nose cone to move upwards and rearwards.

If it is required to hold the nose cone at some intermediate setting, this is done by holding it on the hydraulic power control of the jack. Locks could be provided for intermediate settings but, as such settings would only be required for comparatively short periods, it may be possible to do without them and hold the nose cone solely on the hydraulic power control. In intermediate positions the drag is not as great as when the nose cone is in the "down" position.

I claim:
1. A high speed aircraft including a fixed windscreen which slopes downwards and forwards, a movable panel, and means mounting the panel for movement between a first position in which it lies in front of the windscreen to provide the fuselage of the aircraft with the required streamlined shape for high speed flight and a second position downwards and forwards from the first position in which it lies inside the nose of the aircraft and at least partly exposes the windscreen, said panel in its first position having a surface forming a continuation of the nose surface and forming a substantially smaller angle with the longitudinal axis of the aircraft than the windscreen.

2. A high speed aircraft including a fixed windscreen which slopes downwards and forwards, a movable panel, and means mounting the panel for movement between a first position in which it lies in front of the windscreen to provide the fuselage of the aircraft with the required streamlined shape for high speed flight and a second position downwards and forwards from the first position in which it lies inside the nose of the aircraft and at least partly exposes the windscreen, and means mounting the nose of the aircraft for movement to a lowered position to increase the forward and downwards vision through the windscreen.

3. A high speed aircraft including a fixed windscreen which slopes downwards and forwards, a movable panel, and means mounting the panel for movement between a first position in which it lies in front of the windscreen to provide the fuselage of the aircraft with the required streamlined shape for high speed flight and a second position downwards and forwards from the first position in which it lies inside the nose of the aircraft and at least partly exposes the windscreen, and means mounting the nose of the aircraft for movement to a lowered position to increase the forward and downwards vision through the windscreen, movement of the panel alone only partly exposing the windscreen, the panel mounting means being carried by the nose of the aircraft so that the panel is moved downwards when the nose is lowered and then fully exposes the windscreen.

4. A high speed aircraft including a fixed windscreen which slopes downwards and forwards, a movable panel, and means mounting the panel for movement between a first position in which it lies in front of the windscreen to provide the fuselage of the aircraft with the required streamlined shape for high speed flight and a second position downwards and forwards from the first position in which it lies inside the nose of the aircraft and at least partly exposes the windscreen, and means mounting the nose of the aircraft for movement to a lowered position to increase the forward and downwards vision through the windscreen, said aircraft having a fuselage, said nose mounting means comprising a member rigidly fixed to the under part of the fuselage projecting forwards from the main part of the fuselage into the interior of the nose, and link means pivoted to the nose and member to constrain the nose to move in an arcuate path relative to the fuselage, the path being such that, from a position in alignment with the fuselage, the nose moves bodily downwards and forwards.

5. An aircraft according to claim 4 in which the link means form a parallel motion linkage.

References Cited in the file of this patent

UNITED STATES PATENTS

| | | |
|---|---|---|
| 2,778,586 | Nyerges et al. | Jan. 22, 1957 |
| 2,872,137 | Gluhareff | Feb. 3, 1959 |

FOREIGN PATENTS

| | | |
|---|---|---|
| 358,223 | Italy | Apr. 9, 1938 |
| 987,494 | France | Apr. 18, 1951 |
| 824,560 | Great Britain | Dec. 2, 1959 |